US012558731B2

(12) United States Patent
Pietsch et al.

(10) Patent No.: US 12,558,731 B2
(45) Date of Patent: Feb. 24, 2026

(54) METHOD FOR SEPARATING MULTIPLE SLICES OF WORKPIECES BY MEANS OF A WIRE SAW DURING A SEQUENCE OF SEPARATION PROCESSES

(71) Applicant: Siltronic AG, Munich (DE)

(72) Inventors: Georg Pietsch, Burghausen (DE); Peter Wiesner, Reut (DE)

(73) Assignee: SILTRONIC AG, Munich (DE)

( * ) Notice: Subject to any disclaimer, the term of this patent is extended or adjusted under 35 U.S.C. 154(b) by 815 days.

(21) Appl. No.: 17/795,235

(22) PCT Filed: Jan. 18, 2021

(86) PCT No.: PCT/EP2021/050897
§ 371 (c)(1),
(2) Date: Jul. 26, 2022

(87) PCT Pub. No.: WO2021/151695
PCT Pub. Date: Aug. 5, 2021

(65) Prior Publication Data
US 2023/0050459 A1 Feb. 16, 2023

(30) Foreign Application Priority Data

Jan. 28, 2020 (EP) ..................................... 20154140

(51) Int. Cl.
*B23D 57/00* (2006.01)
*B23D 61/18* (2006.01)
(Continued)

(52) U.S. Cl.
CPC ..... *B23D 57/0061* (2013.01); *B23D 57/0053* (2013.01); *B23D 61/185* (2013.01); *B28D 5/045* (2013.01); *B28D 5/0076* (2013.01)

(58) Field of Classification Search
CPC ............ B23D 57/0061; B23D 57/0053; B23D 61/185; B23D 5/045; B23D 5/0076;
(Continued)

(56) References Cited

U.S. PATENT DOCUMENTS

| | | | | |
|---|---|---|---|---|
| 3,854,898 A | * | 12/1974 | Whitney, Jr. | .......... B24D 18/00 |
| | | | | 51/293 |
| 4,651,513 A | * | 3/1987 | Dambre | .................. C21D 8/06 |
| | | | | 57/902 |

(Continued)

FOREIGN PATENT DOCUMENTS

| | | |
|---|---|---|
| DE | 102013219468 A1 | 3/2015 |
| DE | 102016211883 A1 | 1/2018 |

(Continued)

*Primary Examiner* — Adam J Eiseman
(74) *Attorney, Agent, or Firm* — LEYDIG, VOIT & MAYER, LTD.

(57) ABSTRACT

Wafers are sliced from a workpiece using a wire saw during slicing operations. The wire saw has a wire web of sawing wire and a setting device. The wire web is stretched in a plane between wire guide rollers that are mounted between fixed and moveable bearings. During each of the slicing operations, the setting device feeds the workpiece through the wire web along a feed direction perpendicular to a workpiece axis and perpendicular to the plane of the wire web. During each of the slicing operations, the movable bearings move oscillatingly axialy. The feeding of the workpiece through the wire web includes a simultaneous displacement of the workpiece along the workpiece axis using the setting element in accordance with a correction profile, which includes an oscillating component that is opposite to the effect which the axial moving of the movable bearings has on the shape of the sliced-off wafers.

22 Claims, 8 Drawing Sheets

(51) Int. Cl.
  _B28D 5/00_          (2006.01)
  _B28D 5/04_          (2006.01)

(58) Field of Classification Search
  CPC ............ B23D 57/0007; B23D 57/0003; H01L
                   21/67092; H01L 21/67
  See application file for complete search history.

(56)                References Cited

U.S. PATENT DOCUMENTS

| | | | |
|---|---|---|---|
| 5,377,568 A | | 1/1995 | Hauser |
| 5,616,065 A | * | 4/1997 | Egglhuber ......... B23D 57/0046 |
| | | | 125/16.02 |
| 5,875,770 A | * | 3/1999 | Fukunaga ............ B28D 5/0082 |
| | | | 125/16.02 |
| 7,926,478 B2 | | 4/2011 | Nakai et al. |
| 9,610,641 B2 | | 4/2017 | Vaubourg |
| 2010/0089377 A1 | | 4/2010 | Oishi et al. |
| 2012/0240915 A1 | | 9/2012 | Huber et al. |
| 2013/0174829 A1 | | 7/2013 | Bhagavat et al. |
| 2015/0083104 A1 | | 3/2015 | Pietsch |
| 2015/0314484 A1 | * | 11/2015 | Pietsch .................. B28D 5/045 |
| | | | 125/21 |
| 2019/0061060 A1 | * | 2/2019 | Kamiyama ............. C30B 33/06 |
| 2019/0091782 A1 | * | 3/2019 | Brosnan ............... B23D 61/185 |
| 2019/0270222 A1 | | 9/2019 | Albrecht et al. |
| 2020/0316817 A1 | | 10/2020 | Rieger et al. |

FOREIGN PATENT DOCUMENTS

| | | |
|---|---|---|
| JP | H11165251 A | 6/1999 |
| JP | H11347910 A | 12/1999 |
| JP | 2003145406 A | 5/2003 |
| KR | 101340199 B1 | 12/2013 |
| TW | I453811 B | 9/2014 |
| TW | I596665 B | 8/2017 |
| WO | 2013053622 A1 | 4/2013 |
| WO | WO 2013079683 A1 | 6/2013 |
| WO | WO 2015188859 A1 | 12/2015 |

* cited by examiner

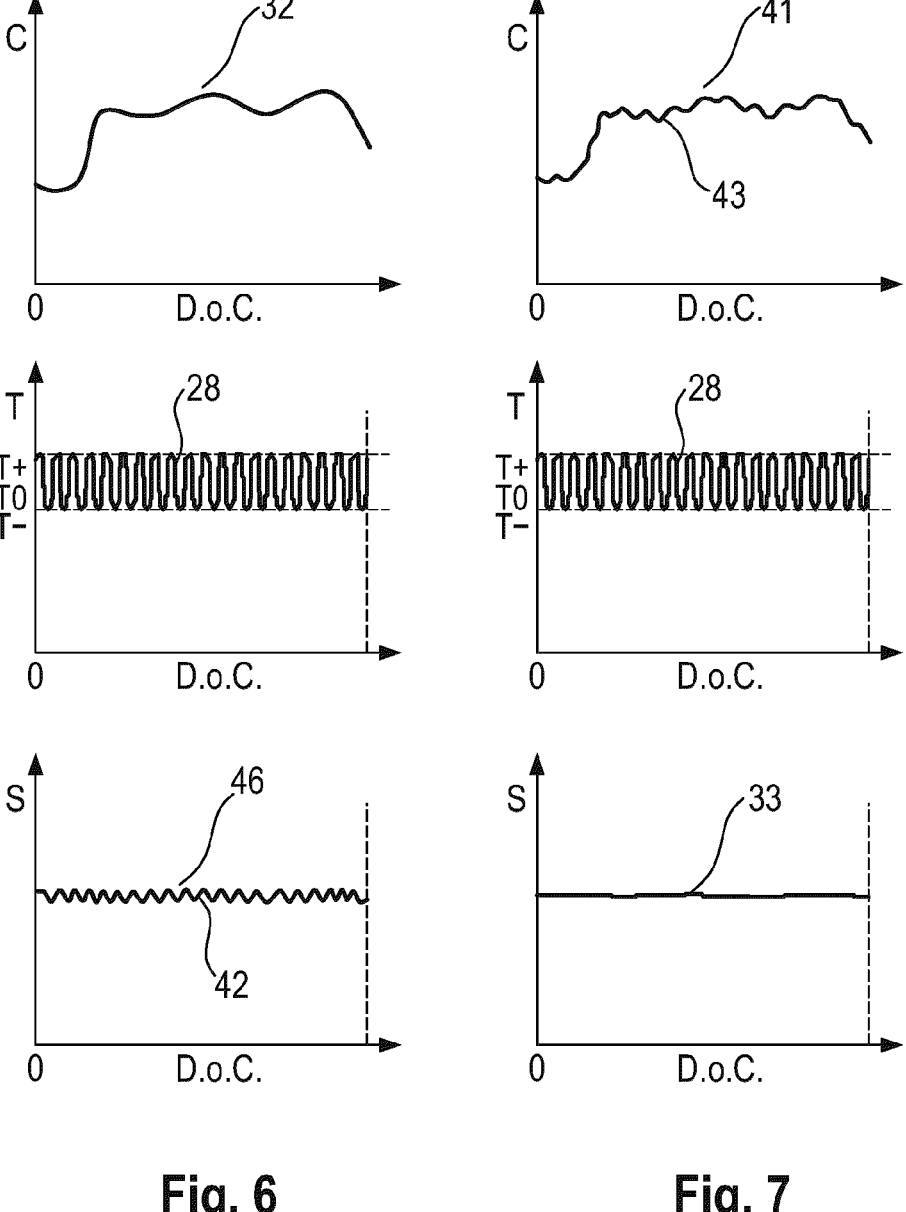
Fig. 6                    Fig. 7

METHOD FOR SEPARATING MULTIPLE SLICES OF WORKPIECES BY MEANS OF A WIRE SAW DURING A SEQUENCE OF SEPARATION PROCESSES

CROSS REFERENCE TO RELATED APPLICATIONS

This application is a U.S. National Phase application under 35 U.S.C. § 371 of International Application No. PCT/EP2021/050897, filed on Jan. 18, 2021, and claims benefit to European Patent Application No. 20154140.6, filed on Jan. 28, 2020. The International Application was published in German on Aug. 5, 2021 as WO 2021/151695 A1 under PCT Article 21(2).

FIELD

The present disclosure relates to a method for slicing a multiplicity of wafers from workpieces by a wire saw during a sequence of slicing operations.

BACKGROUND

There are numerous applications where thin, uniform wafers of a material are needed. One example of such wafers, which are subject to particularly exacting requirements in terms of uniformity and plane-parallelism of their respective front and back sides, are semiconductor wafers that are used as substrates for the fabrication of microelectronic components.

In the course of the slicing-off of wafers by a wire saw, a multiplicity of wafers are sliced off simultaneously from a workpiece. For this, the sawing wire is guided spirally around at least two wire guide rollers in such a way that on the side of two adjacent wire guide rollers that faces the workpiece, which is to be cut up, and which is bonded to a holding bar, a wire web is stretched which is composed of sawing wire sections extending parallel to one another. The wire guide rollers have the form of straight circular cylinders, the axes of these circular cylinders are arranged parallel to one another, and the cylindrical surfaces of the wire guide rollers possess a covering of a wear-resistant material, which is provided with annularly closed grooves which extend in planes perpendicular to the wire guide roller axis and which guide the sawing wire.

Turning the wire guide rollers in the same direction about their cylinder axes produces a movement of the wire sections of the wire web relative to the workpiece, and, by means of the contacting of workpiece and wire web in the presence of an abrasive, the wire sections perform removal of material. Through continued feeding of the workpiece, the wire sections form cutting kerfs in the workpiece and work through the workpiece until they all come to a stop in the holding bar. The workpiece has then been cut up into a multiplicity of uniform wafers, which by means of the bondline hang from the holding bar like teeth of a comb. Wire saws and methods for wire sawing are disclosed, for example, in DE 10 2016 211 883 A1 or from DE 10 2013 219 468 A1.

Wire sawing may be accomplished by lap slicing or grind slicing.

With lap slicing, working fluid in the form of a slurry of hard substances in a liquid carrier medium is supplied to the working space formed between wire surface and workpiece. Removal of material is accomplished in the case of lap slicing by means of a tripartite interaction between tool carrier (sawing wire), tool (abrasive), and workpiece.

With grind slicing, the sawing wire used has hard substances incorporated firmly into its surface, and a working fluid supplied does not itself contain any abrasive substances, and acts as a cooling lubricant. Removal of material in the case of grind slicing takes place by means of a bipartite interaction between a tool in the form of a diamond-coated sawing wire and the workpiece.

The sawing wire is generally a piano wire made, for example, of hypereutectoid pearlite steel. In the case of lap slicing, the hard substances consist, for example, of silicon carbide (SiC), and in the case of grind slicing they consist, for example, of diamond which is bonded form- and force-fittingly to the wire surface by nickel or synthetic resin bonding or by being rolled in. The carrier fluid of the slurry in the case of lap slicing is an oil or glycol, for example, and the cooling lubricant in the case of grind slicing is water, for example, with an addition of wetting agent or of viscosity-modifying additives.

In the case of lap slicing, the sawing wire used is plain or structured; in the case of grind slicing, only plain sawing wire is used. A plain sawing wire possess the form of a circular cylinder with a height corresponding to the wire length. A structured sawing wire is a plain wire which has been provided over its entire length with a multiplicity of protuberances and indentations in directions perpendicular to the longitudinal wire direction. An example of a plain sawing wire for lap slicing is described by WO 13 053 622 A1, an example of structured sawing wire for lap slicing is described by U.S. Pat. No. 9,610,641, and an example of a plain sawing wire with diamond covering for grind slicing is described by U.S. Pat. No. 7,926,478.

The slicing-off of a multiplicity of wafers by means of wire sawing may be accomplished with unidirectional or reciprocal movement of the wire. When operating with unidirectional wire movement, the sawing wire is moved over the entire duration of the slicing operation in a longitudinal wire direction from a first stock of fresh sawing wire onto a second stock of used sawing wire. In the case of wire sawing with reciprocal (bidirectional) wire movement, the sawing wire during the slicing operation is moved by means of at least one pair of directional reversals, where a pair of directional reversals comprises a first moving of the sawing wire by a first length in a first longitudinal wire direction, and a second moving of the sawing wire by a second length in a second direction, which is exactly opposite to the first direction.

In particular, wire sawing with reciprocal movement of wire may comprise a multiplicity of such pairs of wire directional reversals, with the first length being chosen to be greater than the second length, with the overall consequence that during the slicing operation the stock moves from the first stock of fresh sawing wire to the second stock of used sawing wire. The latter method of wire sawing is referred to as pilgrim mode slicing or wire-reciprocating slicing.

The first and second stocks are generally wound onto and from—respectively—spools envisaged for that purpose. The sawing wire in the case of reciprocating wire sawing, during the first moving in the first longitudinal wire direction, may be supplied to the wire web with a first tensile force, which is different from the second tensile force, with which the sawing wire is wound onto the spool for fresh sawing wire, and, after passage through the wire web, the wire can be supplied to the spool for used sawing wire with a third tensile force, which is different from the first tensile force. The second tensile force, with which the sawing wire is wound on the spool for fresh sawing wire, and the third tensile force, with which the sawing wire is wound on the spool for used sawing wire, are generally lower than the first tensile force, with which the sawing wire is supplied to the wire web. This approach is also referred to as tensile force reduction. A lower winding tension of the sawing wire on the spools prevents the sawing wire from digging into the spool winding, becoming locked, and resulting consequently in wire ruptures.

Reciprocating wire sawing may also be carried out such that during the first moving in the first direction by the first length, the fresh sawing wire is supplied to the wire web with a first tensile force in longitudinal wire direction, and, during the second moving in the second direction by the second length, the used sawing wire is supplied to the wire web with a further tensile force in longitudinal wire direction, with the further tensile force being chosen to be lower than the first tensile force. This counteracts wire ruptures, since the maximum tensile force of the used sawing wire which is thinner as a result of wear, is lower than that of the thicker fresh sawing wire.

With customary wire sawing, each of the wire guide rollers is provided, in each case in the vicinity of one of its end faces, with a bearing which is joined firmly to the frame of the machine and is termed a fixed bearing, and, in the vicinity of the opposite end face, is provided with a bearing which is movable in the axial direction of the wire guide roller, relative to the frame of the machine, and which is termed a movable bearing.

Particularly at the moment of first contact between the wire web and the workpiece, in other words on saw engagement (cut-in), there is an abrupt switch in mechanical and thermal loads. The arrangement of wire web and workpiece relative to one another is altered, and the component of this alteration in the direction of the wire guide roller axis means that the cutting kerfs, their sides formed by front side and back side of adjacent wafers, deviate from their planes perpendicularly to the wire guide roller axes—accordingly, the wafers become wavy. Wavy wafers are unsuitable for demanding applications.

There are methods known which are aimed at counteracting the alteration in the arrangement of wire web and workpiece relative to one another during the slicing operation, and hence at improving the plane-parallelism of the major faces of the wafers obtained by the slicing operation.

U.S. Pat. No. 5,377,568 discloses a method wherein the position of a reference surface located externally on the wire guide roller, parallel to and in the vicinity of the end face of the movable bearing, is measured relative to the frame of the machine, and, by temperature control of the wire guide roller interior, a thermal increase in length or decrease in length of the wire guide roller is brought about, until the measured positional change of the reference surface has been compensated again.

JP 2003 145 406 A2 discloses a method wherein an eddy current sensor measures the position of a point externally on a wire guide roller and, in accordance with this positional measurement, changes the temperature of the cooling water which controls the temperature of the wire guide roller interior.

KR 101 340199 B1 discloses a method which uses wire guide rollers which are each rotatably mounted on a hollow shaft, where the hollow shaft can be heated or cooled at different temperatures in a plurality of sections and hence can be expanded or contracted section by section in the axial direction. As a result, for a few sectors at least, the length of the wire guide roller is changed nonlinearly (nonuniformly) in the axial direction.

US 2012/0240915 A1 discloses a method which uses wire guide rollers whose interior and one of their bearings, which bear the wire guide rollers rotatingly, are temperature-controlled independently of one another by means of a cooling fluid.

WO 2013/079683 A1 discloses a method in which first of all the shapes of wafers that result for different temperatures of the wire guide roller bearings are measured, and each of these shapes is stored with the respectively associated bearing temperature, and then, in a downstream step, the bearing temperature selected is that which best matches the desired target shape.

JP 11 165 251 A discloses a method wherein the deflection of the wire sections of the wire web in the direction of the workpiece axis is detected optically (CCD line) for example, and the workpiece is axially displaced correspondingly by means of a piezoelectric setting element, for example.

U.S. Pat. No. 5,875,770 discloses a method wherein the shape of wafers of one cut is measured, a depth-of-cut-dependent correction curve is calculated by forming the difference relative to a desired ideal shape of the wafers, and, in the following cut, the workpiece during the slicing operation is displaced in the axial direction relative to the wire web in accordance with this correction curve.

A common failing of the known methods, as recognized by the present inventors, is that they fail to account for numerous problems—for example, the incidence of spontaneous sudden changes in wafer shape during a slicing operation, and the incidence of a wafer shape which is variable from one slicing operation to the next, corresponding to a drift, and the effect of the switch in thermal and mechanical loads particularly at the phase of cut-in into the workpiece.

SUMMARY

In an embodiment, the present disclosure provides a method that slices off a multiplicity of wafers from a workpiece using a wire saw during a sequence of slicing operations subdivided into initial cuts and first and second subsequent cuts. The wire saw has a wire web of movable wire sections of a sawing wire and a setting device. The wire web is stretched in a plane between two wire guide rollers. Each of the two wire guide rollers is mounted between a fixed bearing and a movable bearing. During each one of the sequence of slicing operations, the setting device is used to feed the workpiece through the wire web along a feed direction perpendicular to a workpiece axis and perpendicular to the plane of the wire web in the presence of a working fluid and of hard substances which act abrasively on the workpiece. During each one of the sequence of slicing operations, the movable bearing of each of the two wire guide rollers moves oscillatingly axially. The feeding of the workpiece through the wire web includes a simultaneous displacement of the workpiece along the workpiece axis using the setting element in accordance with a mandate of a correction profile, which includes an oscillating component that is opposite to the effect which the axial moving of the movable bearing, of each of the two wire guide rollers, has on the shape of the sliced-off wafers.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 6 shows a correction profile with shape profile-based component (top), a temperature profile with oscillating component (middle), and a resulting shape profile (bottom);

FIG. 7 shows, representatively for the present disclosure, a correction profile (top) with shape profile-based component and with oscillating component, a temperature profile (middle) with oscillating component, and a resulting shape profile (bottom);

DETAILED DESCRIPTION

Figure 1:
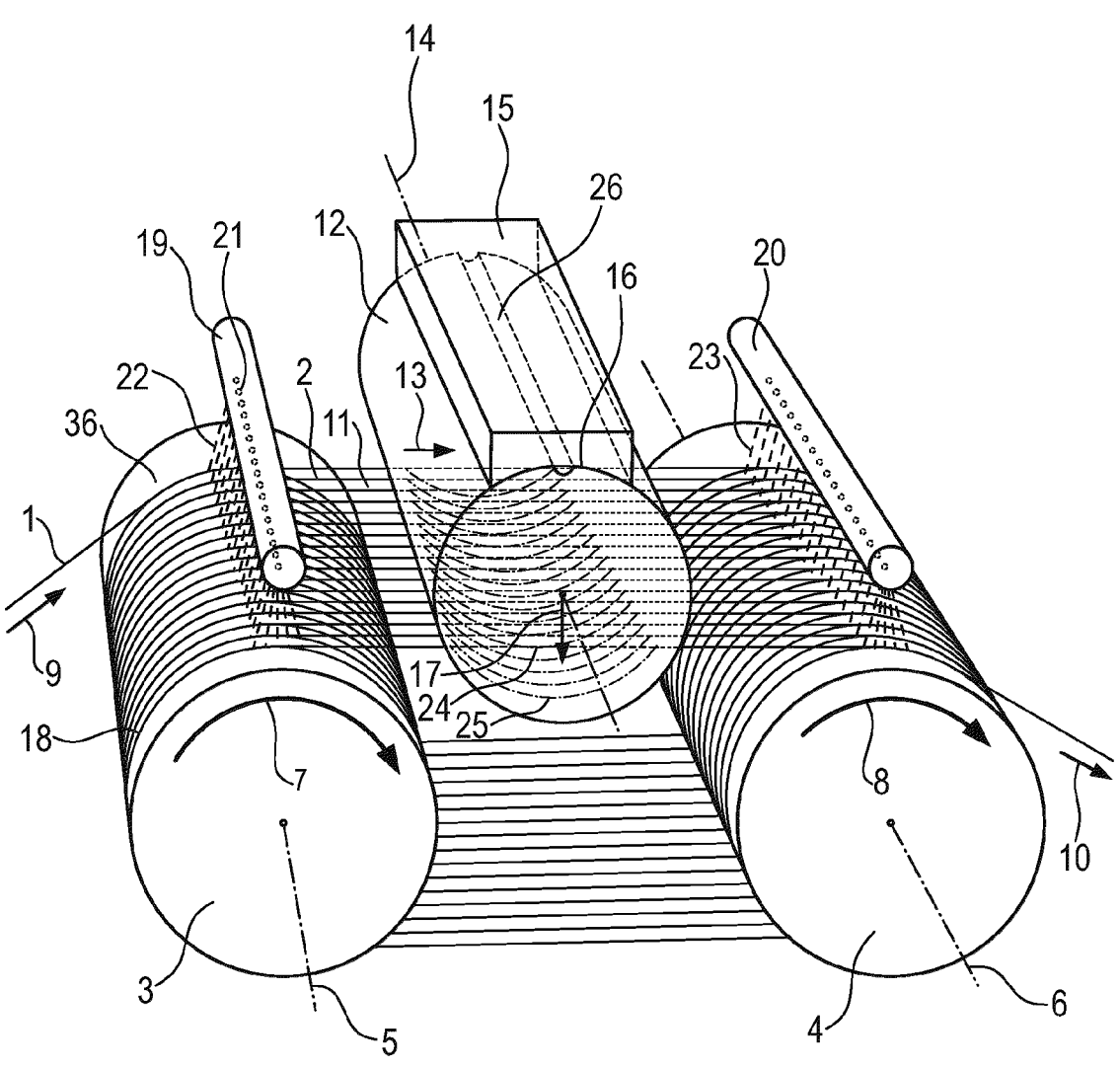
FIG. 1 shows, in a perspective representation features of a wire saw which can be used to carry out the method according to an aspect of the present disclosure.

In an embodiment, the present disclosure addresses the above-described problems in order to provide access to wafers whose shape comes as close as possible to a target shape.

The present disclosure, therefore, relates to a method for slicing a multiplicity of wafers from workpieces by a wire saw during a sequence of slicing operations, where the wire saw comprises a wire web of moving wire sections of a sawing wire and a setting device, and the wire web is stretched in a plane between two wire guide rollers, with each of the two wire guide rollers being mounted between a fixed bearing and a movable bearing.

An aspect of the present disclosure provides a method for slicing off a multiplicity of wafers from workpieces by means of a wire saw during a sequence of slicing operations subdivided into initial cuts and first and second subsequent cuts, where the wire saw comprises a wire web of moving wire sections of a sawing wire and a setting device, and the wire web is stretched in a plane between two wire guide rollers, with each of the two wire guide rollers being mounted between a fixed bearing and a movable bearing, the method comprising during each one of the slicing operations, by means of the setting device, the feeding of the respective workpiece through the wire web along a feed direction perpendicular to a workpiece axis and perpendicular to the plane of the wire web in the presence of a working fluid and of hard substances which act abrasively on the workpiece, which comprises during each one of the slicing operations, the oscillating axial moving of the movable bearings of the two wire guide rollers; and the feeding of the workpiece through the wire web with simultaneous displacement of the workpiece along the workpiece axis by means of a setting element in accordance with the mandate of a correction profile which comprises an oscillating component which is opposite to the effect which the axial moving of the movable bearings has on the shape of the sliced-off wafers.

Wafers sliced off from a workpiece in accordance with the method according to an aspect of the present disclosure are almost entirely unaffected by axial movements of workpiece and wire web relative to one another. Consequently, the deviation in the shape of such wafers from a reference wafer is minimized.

Embodiments according to the present disclosure are therefore employed, preferably, for the production of semiconductor wafers, and more particularly for producing wafers of monocrystalline silicon.

The setting element for displacing the workpiece along the workpiece axis may operate piezoelectrically, hydraulically, pneumatically, electromechanically, or thermally—that is, utilizing thermal expansion. Preference is given to using a controlled piezomechanical setting element, since it enables load-free and creep-free positioning according to mandate, by means of closed-loop control comprising piezoelectric actuator technology and position sensor technology, and since the control is particularly precise and reliable within the relevant positioning range of a few micrometers.

The oscillating axial moving of the movable bearings may be brought about by temperature-controlling the fixed bearings by means of a cooling fluid, by subjecting the cooling fluid to a multiplicity of pairs of switches of cooling and heating relative to a mean temperature. Alternatively, the oscillating axial moving of the movable bearings may also be brought about by means of further setting elements, which engage at the fixed bearings and which operate piezoelectrically, hydraulically, pneumatically, or electromechanically.

Controlling the temperature of the fixed bearings in this way leads to contraction or expansion of the fixed bearings and hence of their components in the axial direction of the wire guide rollers, with the consequence of an axial displacement of the movable bearings and hence a displacement of the wire guide rollers relative to the workpiece. The switches, composed of pairs of fixed-bearing cooling and fixed-bearing heating, are accomplished by exerting influence over the cooling fluid circuit of the fixed bearings. In terms of time, the switches are made on the one hand so slowly that, owing to thermal inertia of the fixed-bearing temperature control, they lead to shifts of the movable bearing of a few micrometers, but on the other hand sufficiently quickly that there are at least 10 switches, consisting of cooling and heating, during the passage of the workpiece through the wire web, namely from the cutting of the wire sections into the workpiece through to the attainment of the overall depth of cut corresponding to the diameter of the workpiece.

The temperature of the coolant is changed with a mandated amplitude relative to a mean temperature. Owing to the thermal inertia of the fixed-bearing temperature control, more switches are possible with lower temperature changes than with higher temperature changes. Accordingly, there is a limit on the temperature bandwidth product, which amounts preferably to not less than 0.025° C./min and not more than 4° C./min, more preferably not less than 0.1° C./min and not more than 1° C./min. The temperature bandwidth product is the product of the amplitude of the temperature change and of the reciprocal of the time spacings of the switches. The amplitude of the temperature change relative to the mean temperature is preferably not less than 0.5° C. and not more than 10° C.

During each one of the initial cuts in the sequence of slicing operations, the workpiece is displaced axially in accordance with the correction profile, with the correction profile preferably comprising only the oscillating component, or in accordance with the correction profile, with the correction profile preferably comprising the oscillating component and a first shape profile-based component, which is proportional to the difference of a first average shape profile and of the shape profile of a reference wafer, and the first average shape profile is determined from wafers which have been sliced off in the course of one or more initial cuts in a preceding sequence of slicing operations.

During each one of the first subsequent cuts, the workpiece is displaced axially in accordance with the correction profile, with the correction profile preferably comprising the oscillating component and a second shape profile-based component, which is proportional to the difference of a second average shape profile and of the shape profile of the reference wafer, and the second average shape profile is determined from wafers which have been sliced off in the course of one or more of the initial cuts in the sequence.

During each one of the second subsequent cuts, the workpiece is displaced axially in accordance with the correction profile, with the correction profile preferably comprising the oscillating component and a third shape profile-based component, which is proportional to the difference of a third average shape profile and of the shape profile of the reference wafer, and the third average shape profile is determined from wafers which originate from at least 1 to 5 slicing operations which have immediately preceded the respective second subsequent cut in the sequence.

The determining of the first, second, and third average shape profiles may be carried out on the basis of a wafer-based selection of wafers. In the case of a wafer-based selection, particular wafers of a slicing operation are employed for determining the respective average shape profile, by averaging, and others are excluded. For example, the only wafers considered for the averaging are those which have a certain position in the workpiece, for instance only every 15th to 25th wafer along the workpiece axis.

Another possibility for wafer-based selection is to exclude wafers having the largest and smallest deviation of the shape profile from the average shape profile of all the wafers from the slicing operation (referred to as truncated average). An alternative possibility is to exclude from the averaging those wafers whose shape profile deviates by more than 1 to 2 sigmas from the average shape profile of all the wafers from the slicing operation.

Determining the second and third average shape profiles may instead take place on the basis of a cut-based selection of wafers. In the case of a cut-based selection, all the wafers from at least one slicing operation are employed for determining a further average shape profile, and all the wafers from at least one other slicing operation are excluded from the determination.

Furthermore, the determining of the second and third average shape profiles may be carried out on the basis of a wafer-based and a cut-based selection. In this case, at least one of the preceding slicing operations is selected and at least one of the preceding slicing operations is excluded, and at the same time certain wafers from the selected slicing operations are selected in each case and others are excluded in each case, and the wafers selected overall in this way are employed for the averaging.

The oscillating component of the correction profile counteracts the relative positional change of wire web and workpiece relative to one another, triggered by the oscillating movement of the movable bearings, in a way which is precise in terms of amount (amplitude) and location (depth of cut), and precisely compensates for shortwave modulations in the shape profile which would be generated if using a correction profile without an oscillating component.

Definitions which are useful for the understanding of the present disclosure, and also considerations and observations which resulted in the present disclosure, are dealt with in the following sections of this description.

The surface of a wafer is made up of the major faces and the minor face. The major faces comprise the front side and back side of the wafer. The center of the wafer is its center of gravity. A wafer can be measured by inserting it along its regression plane between a pair of sensors whose connecting line is arranged perpendicular to the regression plane, and each sensor determines the distance to the major wafer surface facing it, respectively, at measuring points which are points where the connecting line of the sensors passes through the major face. The measuring points may be distributed over the major faces or may be situated along a diameter of the wafer. If they are distributed over the major faces, the measurement results in an area-based value. If the measuring points are distributed over a diameter with the same distance to the closest neighbor, the result of the measurement is a line-based value.

The regression plane denotes the plane which is derived by a regression calculation according to the method of least squares from area-based measurement values. Correspondingly, a regression line is a straight line which is derived by a regression calculation according to the method of least squares from line-based measurement values.

The area-based thickness profile of the wafer refers to an area on which the measurement values $d_i = D - (FD_i + BD_i)$ are located, where $d_i$ is the thickness of the wafer at the measuring position i, D is the distance between the sensors, $FD_i$ is the distance of the upper sensor from the respective measuring point on the front side of the wafer, and $BD_i$ is the distance of the lower sensor from the respective measuring point on the back of the wafer.

The area-based shape profile of the wafer refers to an area on which the measurement values $s_i = D - (FD_i - BD_i)$ are located. An arbitrarily shaped wafer of arbitrary thickness can therefore always be fully described by means of its area-based thickness profile and its area-based shape profile.

Shape profile (shape, S) of a wafer denotes hereinafter the line-based shape profile, plotted along the depth of cut, in other words in the feed direction. The number i of the measuring points distributed over the depth of cut ought preferably not to be less than two times the number of the oscillating movements of the movable bearings—thus, for example, not less than two times the number of the switches consisting of cooling and heating of the movable bearings. Particular preference is given to not less than eight times the switches consisting of cooling and heating of the movable bearings. The measurement values can be supplemented by interpolation to form a continuous curve.

Warp is an example of a characteristic of a shape defect, and denotes the difference between maximum and minimum deviation of the shape profile of a wafer from its regression plane. Waviness is another example of a characteristic of a shape defect of a wafer. Particular interest attaches to the waviness as a function of the depth of cut (line-based, depth-of-cut-dependent waviness). It is determined within a measurement window of predetermined length, the characteristic wavelength of the waviness, by determining the maximum of the distance between the measuring points of the shape profile and the regression line.

The start of the measuring window is moved along the depth of cut from measuring point to measuring point of the shape profile, and the determination of the maximum of the distance is repeated for each position of the measuring window. The quantity of the maxima thus ascertained, plotted against the positions of the respectively associated measuring window, gives a profile of the waviness as a function of the depth of cut. The characteristic wavelength is preferably 2 mm to 50 mm.

The shape profile in the region of the cut-in into the workpiece and in the region of the cut-out from the workpiece is determined from comparatively sharp switches in thermal and mechanical loads.

Depth of cut (D.o.C.) denotes a length opposite to the feed direction in the region from the cut-in into the workpiece up to the cut-out from the workpiece.

An average shape profile is a shape profile obtained by averaging the shape profiles of two or more wafers.

Shape deviation denotes the deviation of a shape profile or of an average shape profile from a target shape profile—for example, from the shape profile of a reference wafer.

A reference wafer is a wafer having a defined thickness profile and shape profile. The reference wafer expediently has a thickness profile and a shape profile for which the measurement values $d_i$ and $s_i$, respectively, are located on the corresponding regression line. The reference wafer selected may alternatively be a wafer having a defined shape profile or a defined thickness profile which deviates from this, as for example a wafer with a wedge-shaped thickness profile or a wafer with constant thickness and a convex or concave shape profile. A shape profile of this kind may be advantageous, since it may counteract a change in shape which is triggered by subsequent application of a strained layer such as an epitaxial layer, for example, to the front side of a wafer, or the application of an oxide layer to the back side of a wafer, for example.

Correction profile denotes an instruction to bring about a relative movement between the workpiece and the wire web by means of a setting element, with the setting element displacing the workpiece along the workpiece axis in accordance with the correction profile. The application of a correction profile in the course of a slicing operation pursues the objective of minimizing the shape deviation of the wafers obtained in the course of the slicing operation. The plot of a correction profile shows the displacement pathway C of the workpiece as a function of the depth of cut.

Temperature profile denotes an instruction to bring about a relative movement between the workpiece and the wire web by means of temperature control of the fixed bearings of the wire web. The plot of a temperature profile shows the temperature T of the cooling fluid for the fixed bearing temperature control as a function of the depth of cut.

One or more aspects of the present disclosure is based on the observations set out below, which pertain to the lap slicing of a straight circular-cylindrical silicon ingot into wafers 300 mm in diameter.

It was observed that the measured shape profiles of the wafers often exhibit discontinuities in the sense of abrupt jumps and peaks. The explanation of the inventors for the occurrence of these jumps is that in the movable bearing, under the switch in mechanical and thermal loads during the slicing operation, axial compressive or tensile stresses are built up, and are dissipated only when the static friction is exceeded suddenly by sliding of the movable bearing in the axial direction. This leads to changes in the shape profiles with high amplitude within very short depths of cut, reflecting the sudden release of the bearing forces that have been built up, within short timescales.

These jumps occur spontaneously and are incapable of prediction temporally, in other words as a function of depth of cut, and they vary in particular from one slicing operation to the next. Because they are unpredictable, they cannot be compensated by a correction profile. These shape deviations are manifested right through to the fully machined wafer, and render the latter unsuitable for demanding applications. Evidence for this explanation has been provided with the fact that the thickness profiles had no jumps at the depths of the cut at which spontaneous jumps in the shape profiles were observed. A spontaneous change in the relative position of workpiece and wire web does not change the thickness of the wafers at the respective depth of cut, but instead relates only to the shape of the wafers.

It has also been observed that a deliberate heating or cooling of the fixed bearing of a wire guide roller, by heating or cooling the cooling fluid of the fixed bearing, for example, leads to an expansion or contraction of the fixed bearing in the axial direction and so brings about a displacement of the movable bearing in the axial direction away from the fixed bearing or toward the fixed bearing, respectively.

It has further been observed that spontaneous jumps in the shape profiles of wafers can be eliminated by keeping the axial position of the movable bearing in motion continuously. The explanation of the inventors for this is that, with continual bearing movement, no static friction can be built up, and therefore the axial position of the movable bearing directly follows the forces acting on the bearing.

It is therefore appropriate to bring about a continued rapid switch in the temperature control of the fixed bearing around a mean temperature of the cooling fluid, by means of a sinusoidal oscillation of the setpoint temperature value, for example. As a result, the movable bearing is kept in continual motion, and unpredictable sudden changes in position of the movable bearing as a consequence of abrupt switches from static friction to sliding friction (stick and slip) are suppressed.

It has been observed, furthermore, that the relative arrangement of workpiece and wire web, particularly at the moment of cut-in, in other words at the moment of the first contact of the workpiece with the wire web, but also over the entire slicing operation, is subject to a sharp switch in thermal and mechanical loads. Hence, when the sawing wire cuts into the workpiece, the cutting work being done on the workpiece transfers a thermal power of several kilowatts to the workpiece, the wire guide rollers, and their bearings, and, during a slicing operation, the wire guide rollers are exposed to a switch in mechanical load with a force in the region of 10 kN (kilonewtons) in the transverse axial direction.

The switch in mechanical load leads to an increase in the friction in the bearings via which the wire guide rollers are connected to the frame of the machine. Firstly, there is an increase in the rolling friction of the rolling elements due to the increased axial load; secondly, there is an increase in the friction due to tilting of the axis of the bearing bushes relative to the axis which the wire guide roller has in the unloaded state. This tilting results in flexing of the bearing bush in the sleeve in which the bearing bush is fitted, this sleeve being connected to the frame of the machine. The flexing work leads to heating at the transition between bearing bush and sleeve.

In particular, the load switches at the moment of cut-in or cut-out may result in the tilting, tipping or locking-up of the movable bearing, which, with a transition from static friction to sliding friction, trigger abrupt jumps in the axial position of the movable bearing, which have a comparatively large amplitude.

The observations also indicate that the rate of the switches of the temperature-controlling of the fixed bearing ought to be as high as possible, in order reliably to ensure that the axial movable bearing position continues to be kept in motion even at moments of rapid load switching induced by the slicing operation itself, and especially the particularly high load switches at the moments of cut-in and cut-out. Nevertheless, there are limits imposed on the rate at which the fixed bearing can have its temperature changed, these limits being imposed in particular by the thermal masses involved, by the thermal resistance as the cooling fluid passes onto the elements of the fixed bearing assembly, and by the rate at which the cooling fluid itself can be heated or cooled on the primary side.

Continuing to keep the movable bearing in motion can also be achieved by measures other than by temperature-controlling the fixed bearings with periodic switches comprising cooling and heating; for example, by means of setting elements which engage on the fixed bearings and operate piezoelectrically, hydraulically, pneumatically, or electromechanically, and more particularly by means of voice coil actuators. In this case it is useful to control the temperature of the fixed bearings in such a way that as far as possible only the fixed bearing heating that is induced by load switching is compensated.

The oscillating axial movement of the movable bearings imposes a shape component, proportional to the bearing movement, on the shape profile of the wafers obtained. Consequently, at depths of cut at which the oscillating axial movement of the movable bearings has been initiated, the shape profiles exhibit corresponding protrusions and indentations.

In order to eliminate this effect, a proposal is made to bring about axial displacement of the workpiece in accordance with a correction profile which as far as possible precisely compensates the oscillating movement of the movable bearings. The relative positions of wire web and workpiece to one another are retained, accordingly, unchanged. Because changes in length as a result of changes in temperature occur with a time delay in light of the thermal inertia of the masses involved, whereas displacements by setting elements such as piezoelectric actuators, for example, take place immediately, this compensation is preferably achieved by triggering the axial displacement of the workpiece with a corresponding delay.

Thickness profiles and shape profiles of wafers with positions on the workpiece axis that are close to one another differ only slightly from one another. Thickness profiles of wafers with positions on the workpiece axis that are further removed from one another are indeed similar, but shape profiles of such wafers differ considerably. Consequently there is no correction profile which can be applied to approximate the shape profile of each wafer of a workpiece to the target shape profile with the same success.

Shape profiles of wafers with the same positions on the workpiece axis generally differ only slightly from one another if they are formed in the course of immediately successive slicing operations. They do, however, generally differ considerably if they have originated from slicing operations between which there have been multiple intervening slicing operations performed. Consequently there is also no correction profile which, when applied and retained, leaves the shape profile of wafers with the same position on the workpiece axis unchanged over multiple successive slicing operations. Instead, the correction profile may have to be changed, at least slightly, from one slicing operation to the next, in order to be able to obtain wafers, over a multiplicity of slicing operations, whose shape profile corresponds approximately to the target shape profile. To be expected, therefore, are slow changes in shape of wafers over multiple slicing operations, in the manner of a drift, and also spontaneous discontinuities in the shape profile of wafers from immediately successive slicing operations.

Proposals made are therefore as follows:

(a) the temperature of the fixed bearing of each one of the wire guide rollers of the wire web should be varied around a mandated average value in accordance with a mandated temperature profile, in continuous switching, in order to prevent jumps in the shape profile of the wafers. Alternatively, the oscillating axial movement of the movable bearings that is produced as a result can be produced by means of setting elements which engage on the fixed bearings. In that case, the temperature control of the fixed bearings is preferably used only in order to dissipate the heat generated by the load switches of the slicing operation; and (b) the workpiece should be shifted along the workpiece axis by means of the setting device in accordance with a correction profile which has imposed on it an oscillating component which in terms of size and frequency is exactly the opposite of the positional switch of the movable bearings.

Furthermore, the sequence of slicing operations is subdivided into initial cuts and first and second subsequent cuts. These cuts differ preferably in terms of the configuration of the correction profile which mandates the displacement of the workpiece along the workpiece axis during the passage of the workpiece through the wire web. The correction profile for the first and second subsequent cuts and optionally for the initial cuts as well comprises not only the oscillating component but also a shape profile-based component which may change from one slicing operation to the next.

The sequence of slicing operations commences usefully after a change in the sawing system: that is, after a change in at least one feature of the wire saw, the sawing wire, or the cooling lubricant. There is a change in the sawing system when, for example, there has been a switch of wire guide rollers or when mechanical adjustments have been made to the wire saw. The first slicing operations in the sequence are initial cuts, preferably in a number of 1 to 5. The initial cuts are carried out, for example, subject to a correction profile which comprises only the oscillating component.

An alternative possibility is to mandate a correction profile for the initial cut that comprises the oscillating component and in addition has a shape profile-based component, which responds to deviations in shape that have occurred after an equivalent change in the sawing system. This first shape profile-based component is proportional to the difference of a first average shape profile and of the shape profile of a reference wafer, with the first average shape profile being determined from wafers which have been sliced off in the course of one or more initial steps of a preceding sequence of slicing operations.

The correction profile of each one of the first subsequent cuts comprises the oscillating component and, preferably, a second shape profile-based component, which is proportional to the difference of a second average shape profile and of the shape profile of the reference wafer, with the second average shape profile being determined from wafers which have been sliced off in the course of one or more of the initial cuts in the sequence.

The correction profile of each one of the second subsequent cuts comprises the oscillating component and preferably a third shape profile-based component, which is proportional to the difference of a third average shape profile and of the shape profile of the reference wafer, with the third average shape profile being determined from wafers which originate from at least 1 to 5 slicing operations in the sequence that have preceded the respective second subsequent cut.

In light of the continual adaptation of the correction profiles from one slicing operation to the next, the shape profiles of the wafers obtained within a few slicing operations will converge toward the shape of the reference wafer, and the deviations in shape will become minimal.

FIG. 1 shows those elements of a wire saw. Sawing wire 1 from a stock (fresh wire spool) is supplied helically by means of grooves 18 in the wear-resistant coating 36 to a left-hand 3 wire guide roller and a right-hand wire guide roller 4 in such a way that a wire web 11 composed of wire sections 2 of the sawing wire 1 that extend parallel to one another is stretched over the side of the wire guide rollers 3 and 4 that faces the workpiece 12. By rotating 7 and 8 the wire guide rollers 3 and 4 in the same direction about their axes 5 and 6 the wire web is moved relatively to the ingot 1. The wire guide rollers possess straight circular-cylindrical shape, and their axes 5 and 6 are aligned in parallel with one another, so that the wire sections 2 of the wire web 11 extend perpendicularly to the axes of the wire guide rollers. The arrows with the reference numbers 9 and 10 denote wire feed and wire take-off, and the arrow with the reference number 13 denotes the movement of the wire sections 2 of the wire web 11.

The workpiece 12 possesses a workpiece axis 14, which is generally aligned parallel to the axes 5 and 6 of the wire guide rollers, and, where the workpiece is made of semiconductor material, it usually has an identification notch 26 as well. In deviation from this it is possible, by targeted twisting of the workpiece axis in a plane parallel to the plane through the wire web 11, to achieve a so-called "misorientation" of the wafers obtained by the slicing operation. The workpiece 12 is connected via a bondline 16 to a holding bar 15, which is in turn connected to a feed device. Via a left-hand jet 22 and a right-hand jet 23 of working fluid, from a left-hand nozzle 19 and a right-hand nozzle 20 with exit openings 21, the wire web 11 receives working fluid.

As a result of rotation of the wire guide rollers and hence movement of the wire sections of the wire web relative to the workpiece, and feeding of the workpiece by means of the feed device in a feed direction 17 perpendicular to the plane of the wire web, the workpiece is brought into contact with the wire web and, on further feeding, with the working fluid present, the sections of wire that are moved bring about removal of material and so form parallel cutting kerfs 25 in the ingot. The operation is continued until the wire sections have worked themselves right through the workpiece, removing the material in the process, and have come to lie in the holding bar 15.

The cutting kerfs then delimit front and back sides of a multiplicity of resultant wafers which, like teeth in a comb, are now connected to the holding bar 15 only by means of the bondline 16. The sawing wire 1 is also subject to removal of material (wear) and, after traversing the wire web, is supplied to a stock of used sawing wire. The arrow 10 denotes the direction of wire take-off. The extent of the cutting kerfs 25 opposite to the feed direction 17 of the ingot feed during the slicing operation is referred to as depth of cut 24.

In a wire lap slicing device suitable for implementing the method of an aspect of the present disclosure, the sawing wire is, for example, a piano wire made of hypereutectic pearlitic steel with a diameter to start with of 175 µm; the working fluid is a slurry of silicon carbide (SiC) having a mean particle size of around 13 µm (FEPA F500) in a carrier fluid comprising dipropylene glycol (DPG). The wire saw comprises, for example, four wire guide rollers—two upper rollers, which stretch the wire web, and two lower rollers, which divert the sawing wire in such a way that space is made between the wire guide rollers to accommodate the wafers that have been sliced off—with a diameter of around 180 mm and distances between the axes of the upper wire guide rollers of 520 mm (length of the wire sections of the wire web).

The sawing wire is moved by means, for example, of a multiplicity of directional reversals in each case by about 320 m forward (movement direction 13) and 240 m backward (opposite to movement direction 13), so that during a pair of wire movements, 320 m+240 m=560 m of sawing wire traverse the cutting kerfs, and the stock of sawing wire is moved onward in total by 320 m−240 m=80 m, meaning that the sawing wire is used 560/80=7×(reciprocating wire method). The sawing wire moves in the longitudinal wire direction at 10 m/s.

The workpiece is, for example, a straight-cylindrical ingot of monocrystalline silicon having a diameter of 301 mm and is fed during the slicing operation as an average of about 0.4 mm/s, so that the entire slicing operation takes about 13 hours. Because of the cutting work performed on the workpiece by the sawing wire and working fluid, the feed rate of the silicon rod to the wire web, and the wire running speed of 10 m/s that is selected, the sawing wire, in the middle of its free length between the wire guide roller axes, i.e., in the middle of the silicon ingot, experiences deflection in the feed direction of about 6 mm. Under these conditions, the sawing wire experiences wear corresponding to a decrease in its diameter of 12 µm. The distance between adjacent grooves in the wire guide roller has therefore been selected to decrease continuously, from the fresh wire entry side to the old wire exit side, by a total of 12 µm in order to compensate the wire wear, so that wafers with the same mean thickness are obtained from the start to the end of the ingot.

Figure 2:
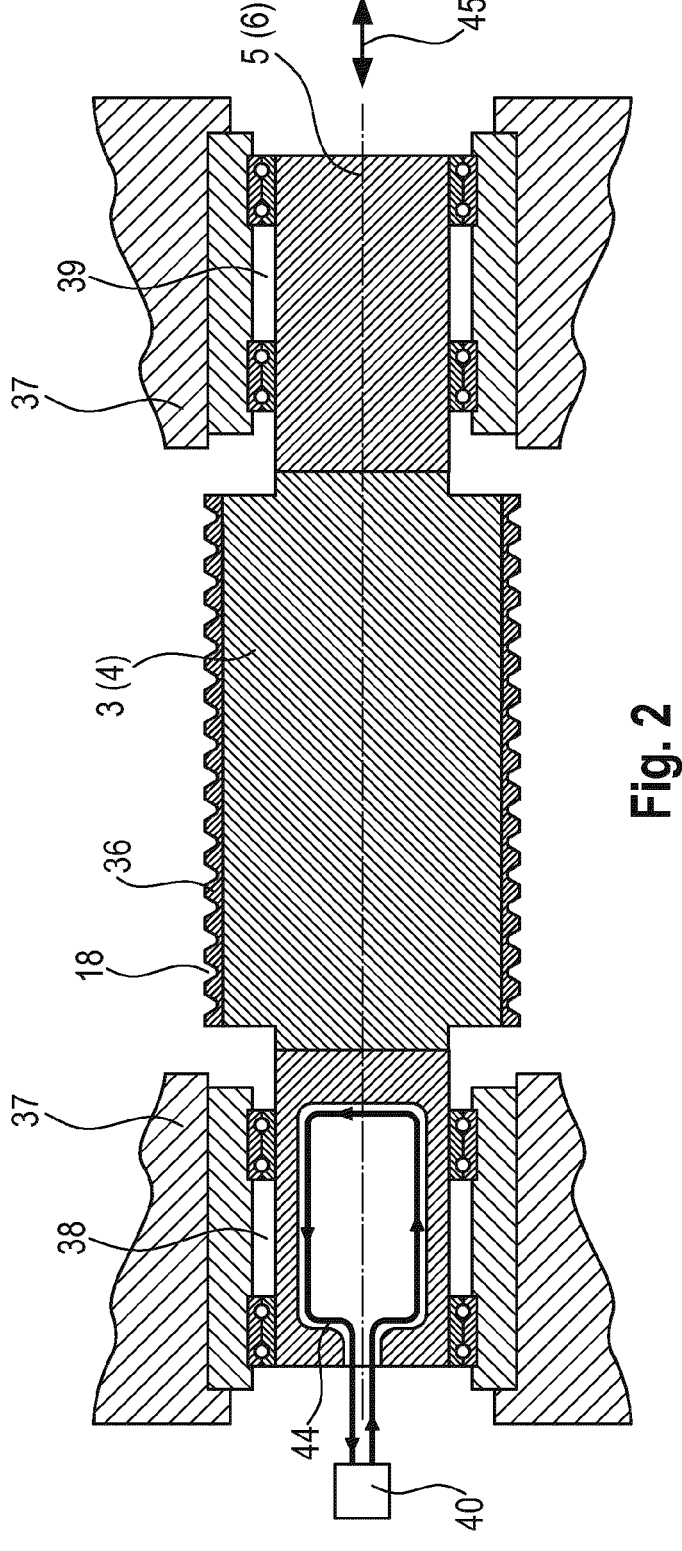
FIG. 2 shows the cross section through a wire guide roller of the wire saw of FIG. 1.

FIG. 2 shows a wire guide roller (left-hand 3 or right-hand wire guide roller 4) in a sectional plane through the wire guide roller axis (5 left-hand or 6 right-hand wire guide roller axis, respectively), with the fixed bearing 38, connected fixedly to the machine frame 37, and with the movable bearing 39, movable relative to the machine frame in the axial direction of the wire guide roller, and with wear-resistant coating 36 and with grooves 18 for guiding the sawing wire. The fixed bearing 38 is cooled or heated by means of a temperature control device 40 and a cooling fluid circuit 44, and so it becomes shorter or expands in the axial direction, so causing the movable bearing 39 and hence the entire wire guide roller to be moved in a leftward or rightward movement direction 45 corresponding to the axial direction.

The movable bearing is maintained on average at a temperature preferably a little above the temperature of the machine frame, at 25-35° C., more preferably at 30° C. (room temperature about 21° C.). A temperature slightly elevated relative to the room temperature has the advantage of uniform heat flow consistently from the wire guide roller into the machine frame (no switch in thermal sign and hence greater stability and more favorable control properties); moreover, heating can be implemented in a more energy-saving way and with greater performance, i.e., more quickly, than cooling.

Figures 3, 4, 5:
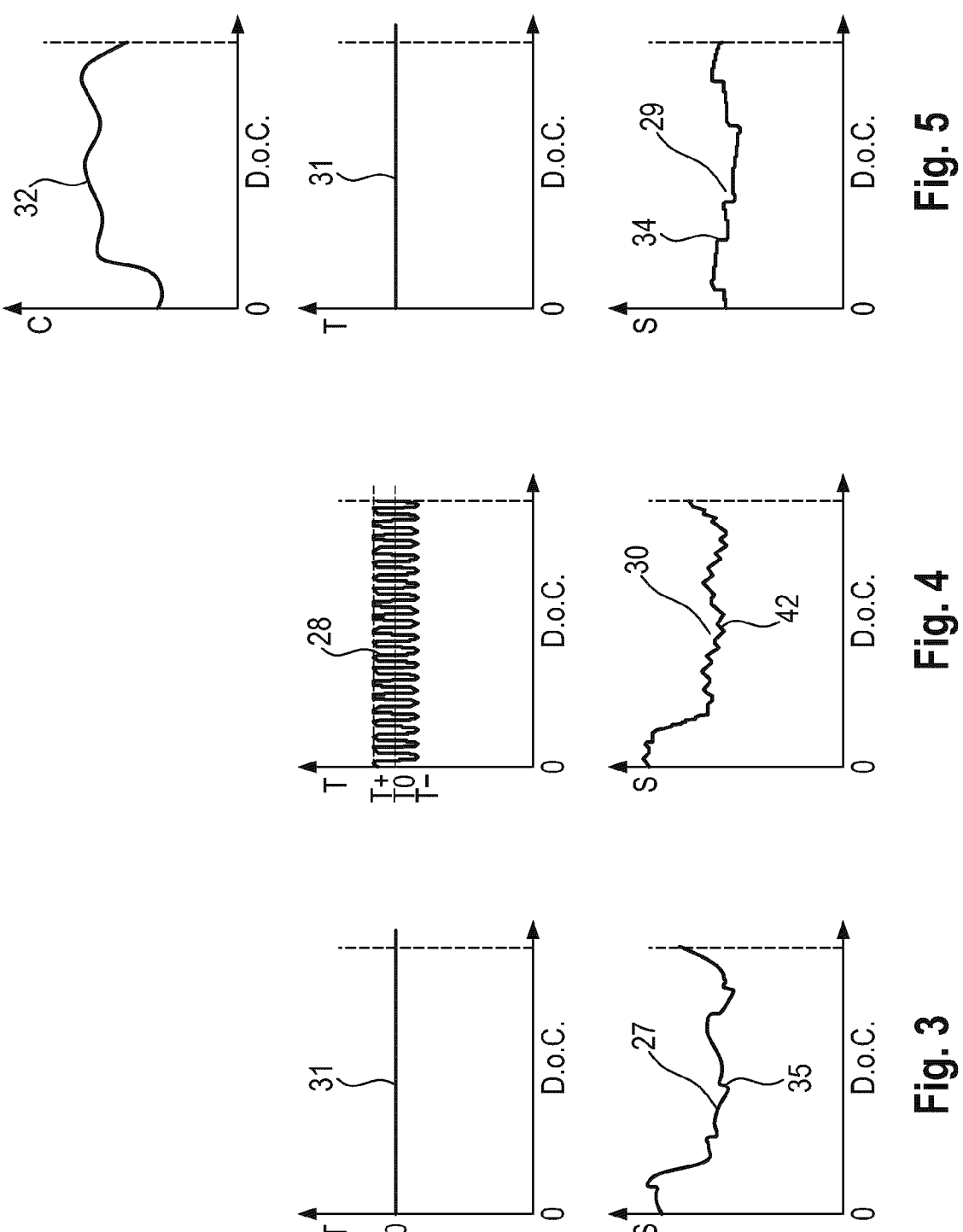
FIG. 3 shows a temperature profile (top) and a resulting shape profile (bottom)
FIG. 4 shows a temperature profile with oscillating component (top) and a resulting shape profile (bottom)
FIG. 5 shows a correction profile with shape profile-based component (top), a constant temperature profile (middle), and a resulting shape profile (bottom)

FIG. 3 shows a constant temperature profile 31 (T=temperature in ° C., D.o.C.=depth of cut in mm) for controlling the temperature of the fixed bearings, and the shape profile 27 (S=shape in μm) of a semiconductor wafer sliced off from a workpiece with application of this temperature profile. The figure shows the temperature profile 31 and the shape profile 27 over a depth of cut of 0 mm (cut-in) up to a depth of cut corresponding to the workpiece diameter of 301 mm (dashed vertical line). The actual maximum depth of cut was 308 mm, in order to take account of the deflection of the wire sections of around 6 mm and in order to ensure that at the end of the feeding of the workpiece, all of the wire sections of the wire web came to lie completely in the holding bar. The shape profile 27 is highly undulating and features abrupt jumps 35, which are explainable as a result of unpredictable sudden movements of the movable bearings. For demanding applications, a semiconductor wafer with this kind of unevenness is unsuitable.

The jumps 35 are an expression of portions of high amplitudes at high spatial frequencies in the Fourier decomposition of the shape profile 27. Because of the stiffness of the semiconductor wafer in the region of high spatial frequencies, all of the operations on the semiconductor wafer that follow wire sawing (lapping, grinding, etching, polishing) act as low pass. This means that these operations are capable of attenuating the abrupt jumps 35 to a certain degree by smoothing. Nevertheless, even after the final polishing of the semiconductor wafer, there still remains a local unevenness (local undulation) whose spatially high-frequency components are situated within the wavelength range of the nanotopology. For the nanotopology (local unevenness of the fully machined wafer) there are particularly exacting requirements, since it describes the region of the lateral extent of critical structural parameters of semiconductor components and, if the nanotopology is not good enough, multi-layer components in particular may lead to structural-mechanical or electrical break-throughs or break-downs in the wiring planes, with the effect of complete failure of the component.

FIG. 4 shows a temperature profile 28 with an oscillating component for controlling the temperature of the fixed bearings, and the shape profile 30 of a semiconductor wafer which has been sliced off from a workpiece, with application of this temperature profile, without displacement of the workpiece during passage through the wire web. The temperature profile 28 envisages a continued temperature switch with a mean temperature T0 and with amplitudes T+ and T−.

Like the shape profile 27, the shape profile 30 indicates a semiconductor wafer which is comparatively uneven. However, owing to the temperature switches mandated by the temperature profile 28, and owing to the resultant continuous movement of movable bearings, free from static friction, the jumps 35 are absent, and, correspondingly, the nanotopology of the semiconductor wafer after subsequent operations, including polishing, is improved. There nevertheless remains a longwave unevenness which makes the semiconductor wafer that has been sliced off less suitable for demanding applications. On account of the oscillating switch in the temperature of the fixed bearings, the relative position of workpiece and wire web with respect to one another is altered in a continued way during the passage of the workpiece through the wire web. This imposes, in addition, a regular shortwave modulation 42 on the shape profile 30. However, the temperature switch does not cause any abrupt jumps in the shape profile, and a subsequent operation of lapping, grinding, etching, and polishing on the semiconductor wafer no longer leaves behind any local undulation in the critical wavelength range of the nanotopology.

FIG. 5 shows a correction profile 32 (C=correction profile), a constant temperature profile 31 for controlling the temperature of the fixed bearings, and the shape profile 29 of a semiconductor wafer which has been sliced off from a workpiece with application of the temperature profile 31 and of the correction profile 32. In accordance with the mandate of the correction profile, the workpiece is displaced by means of a setting element along the workpiece axis relative to the machine frame and relative to the wire web in a manner which is dependent on the depth of cut and is such as to result in an almost planar shape profile of the semiconductor wafer. On account of the constant temperature profile 31, the shape profile 29 of the semiconductor wafer obtained exhibits abrupt jumps 34.

FIG. 6 shows a correction profile 32 with shape profile-based component, the temperature profile 28 with oscillating component, and the shape profile 46 of a semiconductor wafer which has been sliced off from a workpiece during a subsequent cut, in accordance with an aspect of the present disclosure, with application of the temperature profile 28 and of the correction profile 32. The configuration of the correction profile 32 is such that it comprises a shape profile-based component, which is proportional to the difference of an average shape profile and of the shape profile of a reference wafer, taking account of a wire saw-specific proportionality constant. The average shape profile is based on the shape profiles of a selection of semiconductor wafers resulting from a selection of preceding slicing operations.

The wire saw-specific proportionality constant (in μm/° C.) indicates which shape deviation ΔS (in μm) results in a change in the temperature ΔT of the fixed bearing temperature control by 1° C. It is somewhat different from one wire saw to another, since the heat transition from the cooling fluid to the fixed bearings is specific to each wire saw, owing to differences in construction, to different flow quantities and flow rates of the cooling fluid, and owing to differences in the performance of the heat exchangers used.

The wire saw-specific proportionality constant is usefully determined experimentally a single time for a wire saw, by employing a temperature profile during a test cut that envisages multiple temperature jumps around a defined temperature at different depths of cut, and measuring the effect thereof in the form of a shape deviation (in μm) in the shape profile of the semiconductor wafers obtained. There is no need for a precise determination of the wire saw-specific proportionality constant, since, because of the converging mechanism mentioned, any error in the determination results only in a slower rate of the convergence of the average shape profile to the desired shape profile of the reference wafer.

The mean temperature T0 in the temperature profile 28 of FIG. 6 was 30° C., and, over the entire duration of the slicing operation, of 13 h (=780 min), 20 pairs of temperature increases and temperature reductions were performed, with amplitudes T+ and T− of ±3° C. Owing to the application of the correction profile 32, the shape profile 46 of the semiconductor wafer obtained is comparatively planar and in particular has no abrupt jumps 35 resulting from unpredictable sudden movements of the movable bearings of the wire guide rollers of the wire web. Superimposed on the shape profile 46, in accordance with expectations, and because of the temperature switches, is a regular shortwave modulation 42, mandated by the temperature profile 28. The undulation corresponding to the modulation is comparatively longwave and has a comparatively low amplitude, and it disappears almost completely by the subsequent operations (lapping, grinding, etching, polishing) after polishing, so providing access to semiconductor wafers having, by comparison, very good local planarity (nanotopology).

FIG. 7, lastly, shows a correction profile 41 with shape profile-based component and with oscillating component, the temperature profile 28 with oscillating component, and the shape profile 33 of a semiconductor wafer which has been sliced off from a workpiece during a subsequent cut, in accordance with an aspect of the present disclosure, with application of the temperature profile 28 and of the correction profile 41. The configuration of the correction profile 41 is such that it comprises a shape profile-based component, which is proportional to the difference of an average shape profile and of a reference wafer, taking account of a wire saw-specific proportionality constant. The average shape profile is based on the shape profiles of a selection of semiconductor wafers resulting from a selection of preceding slicing operations. In comparison with the correction profile 32, the correction profile 31 has been extended to include an oscillating component 43, which is directed against the regular shortwave modulation 42 imposed by the temperature profile 28. As a result, the modulation is compensated precisely and a semiconductor wafer having the shape profile 33 is obtained, the profile being distinguished by a degree of planarity which is very high by comparison. The profile in particular is free from longwave unevennesses resulting from a drift in the relative positions of workpiece and wire web to one another, free from abrupt jumps resulting from unpredictable sudden movements in the movable bearings, and free from regular shortwave modulations triggered by the oscillating component in the temperature profile 28.

The cutting work performed by the wire sections in the presence of hard substances during the slicing operation results in a deflection of the wire sections in the direction of the feed of the workpiece onto the wire web. This deflection leads to a delayed attainment of the depth of cut which would be anticipated in accordance with a current position of the feeding of the workpiece. The depth of cut actually achieved at a defined point in time is lower because of the deflection of the wire sections. It is useful to take account of this by adjusting the rate at which the workpiece is fed onto the wire web in such a way that the temporal cutting volume remains substantially constant throughout the cut duration. In the slicing operation which yielded the semiconductor wafer having the shape profile 53 shown in FIG. 7, this procedure was adopted, and throughout the slicing operation the deflection remained constant at about 6 mm, except during the cut-in phase over a length of 6 mm. Within this phase, the deflection of the wire sections increased. The deflection was read off directly from the curvature of the sawing grooves which are formed on the wafer surfaces particularly when carrying out wire sawing by the reciprocating wire method.

Furthermore, the thermal inertia of the material from which the fixed bearings are made produces a temporal delay in the onset of the oscillating axial movement of the movable bearings, in comparison with the oscillating component of the temperature profile that triggers them. This delay is usefully likewise taken into account, preferably by ascertaining the delay experimentally. Accordingly, in a test cut, with known positions of the feeding of the workpiece, it is possible to amend the temperature mandate for the fixed bearing temperature control and to measure, on a resulting wafer, the actual depth of cut at which the amended temperature mandate has had the effect of changing the shape profile of the wafer. Based on a measurement of this kind, the temporal delay of the onset of the oscillating axial movement of the movable bearings was taken into account in the example represented by FIG. 7 as well.

With the configuration of the correction profile 41, both delays have been taken into account. Correspondingly, the course of the correction profile is displaced in such a way that the additional shortwave modulation of the shape profile of the semiconductor wafers obtained, the modulation having been brought about by the temperature switches mandated in the temperature profile 28, has been compensated precisely in terms of time and of depth of cut. The amplitude of the correction profile component responding to the temperature switches resulted from the predetermined wire saw-specific proportionality constant (in $\mu m/° $ C.), which models the relationship between temperature change (in ° C.) and resultant shape profile change (in $\mu m$).

The oscillating axial movement of the movable bearings as a result of temperature control of the fixed bearings, by means of a multiplicity of pairwise switches composed of heating and cooling, is referred to below as WGTO (Wire-Guide Temperature Oscillation). The use of WGTO is preferred, since in general a wire saw already possesses a wire guide roller bearing cooling facility, and WGTO can therefore be implemented without changes to construction on existing wire saws. In place of WGTO, the oscillating movement of the movable bearings which it targets can also be brought about by means of setting elements, as for example by means of piezoelectric, hydraulic, pneumatic, or electromechanical setting elements, more particularly by means of voice coil actuators.

The displacement of the workpiece along the workpiece axis in accordance with a correction profile during the passage of the workpiece through the wire web is accomplished preferably by means of a piezoelectric setting element. A displacement of this kind is referred to below as IPPC (Ingot-Position Piezo Control). It is preferred to apply IPPC in order thereby to improve the shape profile of a wafer. The displacement of the workpiece along the workpiece axis in accordance with a correction profile may also be brought about, however, by setting elements which operate, for example, thermally, hydraulically, pneumatically, or electromechanically.

During the production of a semiconductor wafer with the shape profile 33 according to FIG. 7, the fixed bearings were temperature-controlled in accordance with the temperature profile 28. Prior to the attainment of the maximum depth of cut of 301 mm, the temperature profile required a number of 20 pairwise temperature switches composed of cooling and heating, with amplitudes of ±3° C. relative to a mean temperature. For a slicing operation duration of 13 h (=780 min), the temperature-bandwidth product was 3° C.×20/780 min≈0.08° C./min.

The amplitude of the temperature switches is preferably not less than ±0.5° C., in order reliably to suppress abrupt switches from static friction to sliding friction in the course of an axial movement of the movable bearings, and preferably is not more than ±10° C. Higher amplitudes are almost impossible to implement technically, owing to the temporal delay with which the thermal expansion triggered by the temperature switch occurs. At larger amplitudes, moreover, the thermal expansion has nonlinear components, the effect of which can no longer be predictably compensated with a correction profile.

The number of pairwise temperature switches which a temperature profile ought to mandate is preferably at least 10 pairs composed of cooling and heating in the course of the passage of the workpiece through the wire web, in other words from the point of cut-in into the workpiece up to the attainment of the total depth of cut. This minimum number is generally sufficient in order reliably to suppress abrupt switches from static friction to sliding friction in the course of an axial movement of the movable bearings. There is an upper limit on the number of pairwise temperature switches during the duration of the passage of the workpiece through the wire web, owing to the heat capacity and to the associated inertia of the thermal masses affected. In the case of more than two pairs composed of cooling and heating per minute, it is hardly possible to avoid abrupt switches from static friction to sliding friction in the course of an axial movement of the movable bearings.

The temperature-bandwidth product is preferably not less than 0.025° C./min and not more than 4° C./min, more preferably not less than 0.1° C./min and not more than 1° C./min.

The method according to an aspect of the present disclosure has also been employed successfully for subsequent cuts for which the application of WGTO envisaged temperature switches with amplitudes of ±3° C., a number of 160 pairs composed of cooling and heating during a cut duration of 13 h (=780 min), so that the temperature-bandwidth product was 3° C.×160/780 min=0.615/min.

FIG. 8 to FIG. 11 make it clear how shape profiles are determined, and show the relationship between shape profile and associated shape profile-based component of the correction profile.

Figure 8:
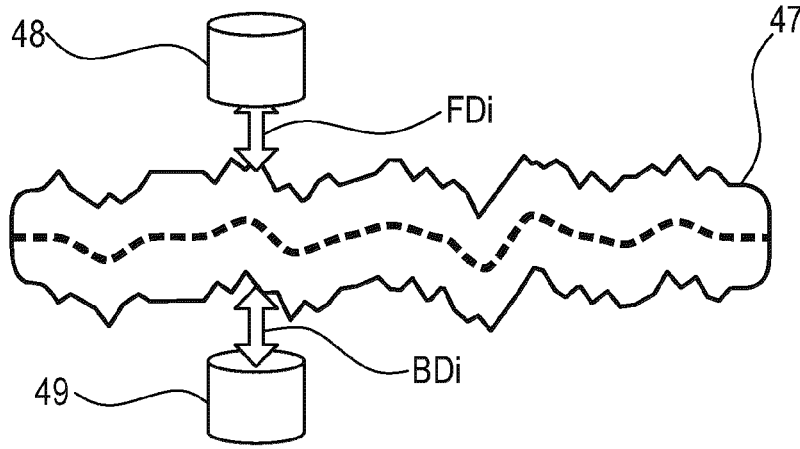
FIG. 8 shows, schematically, an arrangement for determining the shape profile of a wafer.

FIG. 8 shows the arrangement of a wafer 47 in a measuring device for determining the thickness profile and the shape profile of the wafer. For this purpose, the wafer is moved horizontally along the depth of cut between the upper sensor 48 and the lower sensor 49. The sensors measure the distances FDi and BDi at measuring points i which correspond to defined depth-of-cut positions. The distance FDi denotes the distance of the upper sensor 48 from its opposite front side of the wafer 47, and BDi denotes the distance of the lower sensor 49 from its opposite back side of the wafer 47.

Figure 9:
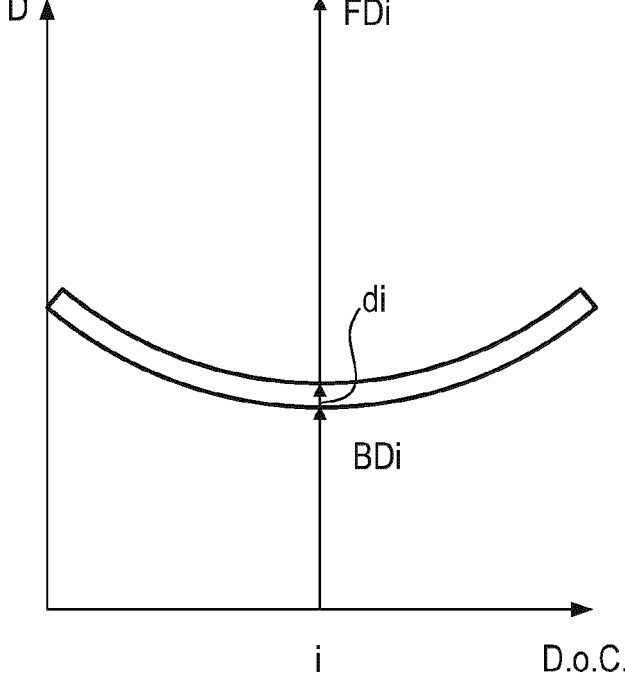
FIG. 9 shows a corresponding arrangement with a wafer having concave shape.

FIG. 9 shows a comparable situation for a wafer with concave shape The distance D denotes the distance between the sensors. The distance di denotes the thickness of the wafer at the measuring point i, which can be ascertained by means of the aforementioned calculation protocol. In analogy to this, it is possible to calculate the measurement values for the shape profile of the wafer, employing the further aforementioned calculation protocol.

Figure 10:
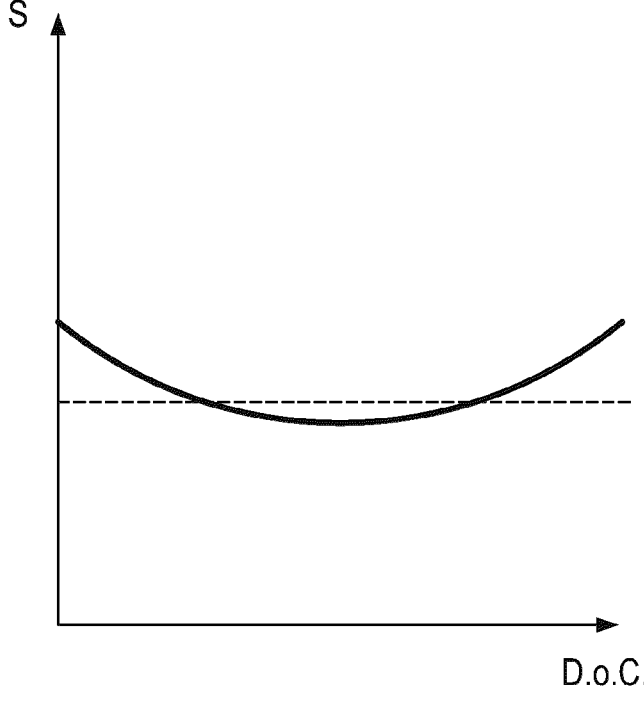
FIG. 10 shows a shape profile of the wafer having concave shape and the shape profile of a reference wafer.

FIG. 10 shows the corresponding shape profile (solid curve) of the wafer of FIG. 9, and the shape profile of a reference wafer (dashed line).

Figure 11:
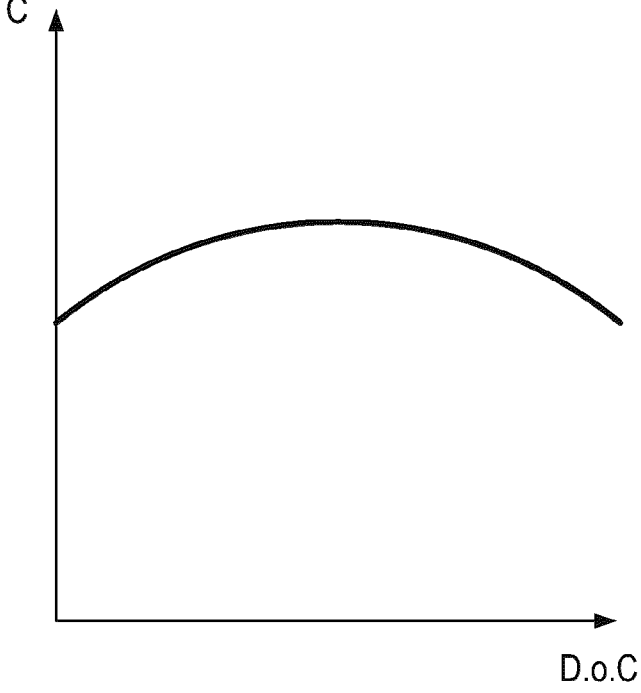
FIG. 11 shows a correction profile consisting of a shape profile-based component which is derived from the shape profile of FIG. 10. It is proportional to the difference of the shape profiles of the wafer having concave shape and the reference wafer.

FIG. 11 represents the correction profile with shape profile-based component which is derived from the shape profile of FIG. 10. It is proportional to the difference of the shape profiles of the wafer and of the reference wafer.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS AND ABBREVIATIONS USED

1 Sawing wire
2 Wire section
3 Left-hand wire guide roller
4 Right-hand wire guide roller
5 Axis of the left-hand wire guide roller
6 Axis of the right-hand wire guide roller
7 Rotation of the left-hand wire guide roller
8 Rotation of the right-hand wire guide roller
9 Wire feed
10 Wire take-off
11 Wire web
12 Workpiece (semiconductor ingot)
13 Movement of the wire sections
14 Workpiece axis
15 Holding bar
16 Bondline
17 Feed direction
18 Grooves
19 Left-hand nozzle
20 Right-hand nozzle
21 Exit openings
22 Left-hand jet
23 Right-hand jet
24 Depth of cut
25 Cutting kerf
26 Identification notch 27 Shape profile
28 Temperature profile
29 Shape profile
30 Shape profile
31 Temperature profile
32 Correction profile
33 Shape profile
34 Abrupt jump
35 Abrupt jump
36 Coating
37 Machine frame
38 Fixed bearing
39 Movable bearing
40 Temperature control device
41 Correction profile
42 Regular shortwave modulation
43 Oscillating component
44 Cooling fluid circuit
45 Movement direction of the movable bearing
46 Shape profile
47 Wafer
48 Upper sensor
49 Lower sensor
T Temperature of the cooling fluid
T+ Amplitude
T– Amplitude
T0 Mean temperature of the cooling fluid
S Shape
C Displacement pathway of the workpiece
D Distance between the sensors
ΔS Shape deviation
ΔT Temperature change
FDi Distance of the upper sensor from the front side of the wafer at the measuring point i
BDi Distance of the lower sensor from the back side of the wafer at the measuring point i
i Measuring point
di Thickness of the wafer at the measuring point i
si Shape of the wafer at the measuring point i
D.o.C. Depth of cut
WGTO Wire-guide temperature oscillation
IPPC Ingot position piezo control

The invention claimed is:

1. A method for slicing off a multiplicity of wafers from a workpiece using a wire saw during a sequence of slicing operations subdivided into initial cuts and first and second subsequent cuts, the wire saw comprising a wire web of movable wire sections of a sawing wire and a setting device, the wire web being stretched in a plane between two wire guide rollers, each of the two wire guide rollers being mounted between a fixed bearing and a movable bearing, the method comprising:

during each one of the sequence of slicing operations, using the setting device, feeding the workpiece through the wire web along a feed direction perpendicular to a workpiece axis and perpendicular to the plane of the wire web in the presence of a working fluid and of hard substances which act abrasively on the workpiece, wherein, during each one of the sequence of slicing operations, the movable bearing of each of the two wire guide rollers moves oscillatingly axially, wherein the feeding of the workpiece through the wire web comprises a simultaneous displacement of the workpiece along the workpiece axis using a setting element in accordance with a mandate of a correction profile, which comprises an oscillating component which is opposite to the effect which the axial moving of the movable bearing, of each of the two wire guide rollers, has on the shape of the sliced-off wafers, and wherein the correction profile, in the case of each one of the first subsequent cuts, includes a second shape profile-based component, which is proportional to a difference of a second average shape profile and of a shaped profile of the reference wafer, and the second average shape profile is determined from wafers which have been sliced off in the course of one or more of the initial cuts in the sequence.

2. The method as claimed in claim 1, wherein the correction profile, in the case of each of the initial cuts, includes a first shape profile-based component, which is proportional to a difference of a first average shape profile and of a shape profile of a reference wafer, and the first average shape profile is determined from wafers which have been sliced off in the course of one or more initial cuts of a preceding sequence of slicing operations.

3. The method as claimed in claim 1, wherein the correction profile, in the case of each one of the second subsequent cuts, includes a third shape profile-based component, which is proportional to a difference of a third average shape profile and of a shape profile of the reference wafer, and the third average shape profile is determined from wafers which originate from at least 1 to 5 slicing operations in the sequence that have immediately preceded the respective second subsequent cut.

4. The method as claimed in claim 1, wherein the setting element operates piezoelectrically, hydraulically, pneumatically, electromechanically, or thermally.

5. The method as claimed in claim 1, wherein the oscillating axial moving of the movable bearing, of each of the two wire guide rollers, is brought about by further setting elements which engage on the fixed bearings and operate piezoelectrically, hydraulically, pneumatically, or electromechanically.

6. The method as claimed in claim 1, wherein the oscillating axial moving of the movable bearing, of each of the two wire guide rollers, is brought about by temperature-controlling the fixed bearings with a cooling fluid, the cooling fluid being subjected to a multiplicity of pairs of switches comprising cooling and heating relative to a mean temperature.

7. The method as claimed in claim 6, wherein, in the switches, a temperature change in the cooling fluid is brought about that has an amplitude relative to a mean temperature of not less than 0.5° C. and not more than 10° C.

8. The method as claimed in claim 7, wherein a product of the amplitude of the temperature change and a reciprocal of time spacings of the switches is not less than 0.025° C./min and not more than 4° C./min.

9. The method as claimed in claim 8, wherein the product is not less than 0.1° C./min and not more than 1° C./min.

10. The method as claimed in claim 6, wherein during the passage of the workpiece through the wire web, at least 10 pairs of switches comprising cooling and heating of the cooling fluid are performed.

11. The method as claimed in claim 2, comprising determining the first average shape profile on the basis of a wafer-based selection of wafers.

12. The method as claimed in claim 1, comprising determining the second average shape profile on the basis of a cut-based selection of wafers.

13. The method as claimed in claim 3, comprising determining the third average shape profile on the basis of a wafer-based and a cut-based selection of wafers.

14. The method as claimed in claim 2, comprising determining the first average shape profile on the basis of a weighted averaging of the shape profile of wafers.

15. The method as claimed in claim 1, which comprises, when configuring the correction profile, taking account of a wire saw-specific proportionality constant and of a deflection of the wire sections.

16. The method as claimed in claim 1, wherein the sawing wire is a hypereutectic pearlitic steel wire and has a diameter of 70 to 175 μm.

17. The method as claimed in claim 1, wherein the sawing wire has a structure which comprises a multiplicity of protuberances and indentations perpendicular to the longitudinal wire axis.

18. The method as claimed in claim 1, comprising the supplying of a cooling lubricant as working fluid to the wire sections during each one of the sequence of slicing operations, with the hard substances comprising diamond and being fixed on the surface of the sawing wire by electroplating, by synthetic resin bonding or by form-fitting bonding, and the cooling lubricant being free of substances which act abrasively on the workpiece.

19. The method as claimed in claim 1, comprising the supplying of the working fluid in the form of a slurry of the hard substances in glycol or oil to the wire sections during each one of the slicing operations, with the hard substances consisting of silicon carbide.

20. The method as claimed in claim 1, comprising the moving of the sawing wire in a continued sequence of pairs of directional reversals, with each pair of directional reversals comprising a first moving of the sawing wire in a first longitudinal wire direction by a first length, and a second, subsequent moving of the sawing wire in a second longitudinal wire direction by a second length, with the second longitudinal wire direction being opposite to the first longitudinal wire direction, and the first length being greater than the second length.

21. The method as claimed in claim 20, wherein the sawing wire during movement in the first longitudinal wire direction by the first length is supplied to the wire web with a first tensile force from a first wire stock, and during movement in the second longitudinal wire direction by the second length is supplied to the wire web with a further tensile force from a second wire stock, with the further tensile force being lower than the first tensile force.

22. The method as claimed in claim 1, wherein the workpiece consists of a semiconductor material.

* * * * *